March 25, 1930. J. COOPER 1,752,065
AUTOMATIC EXTENSIBLE TABLE
Filed Dec. 1, 1927 2 Sheets-Sheet 1
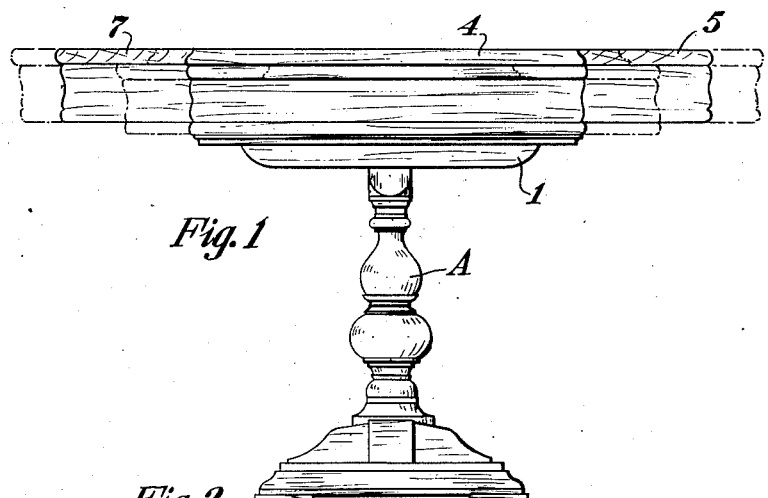
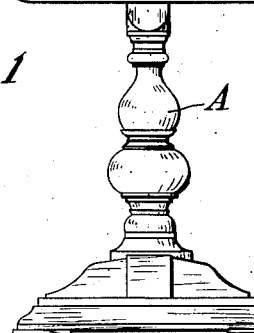
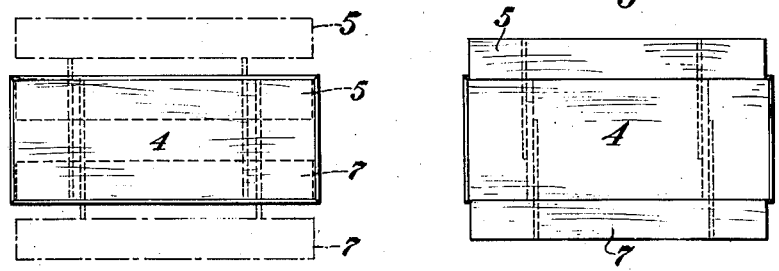
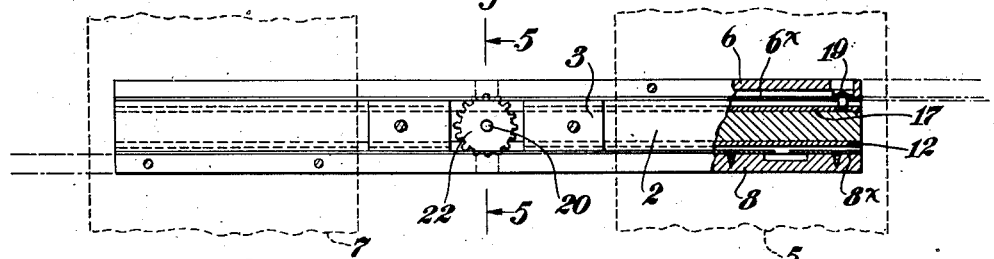
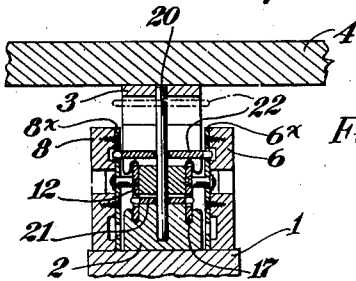
INVENTOR
BY
ATTORNEY March 25, 1930.  J. COOPER  1,752,065
AUTOMATIC EXTENSIBLE TABLE
Filed Dec. 1, 1927  2 Sheets-Sheet 2
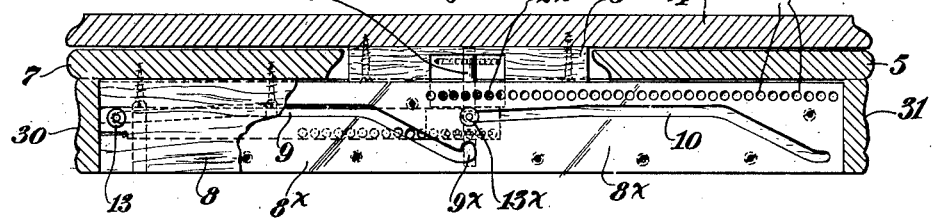
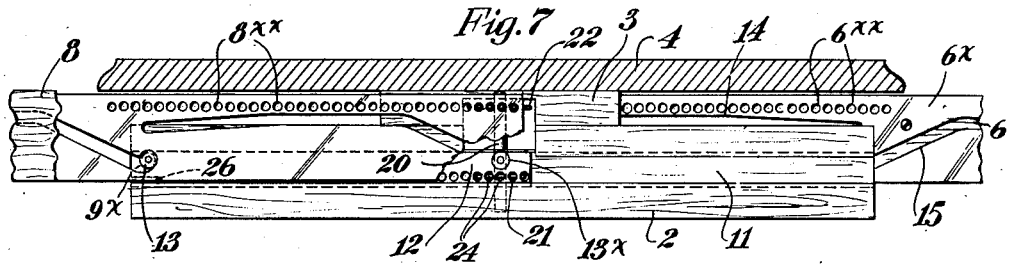
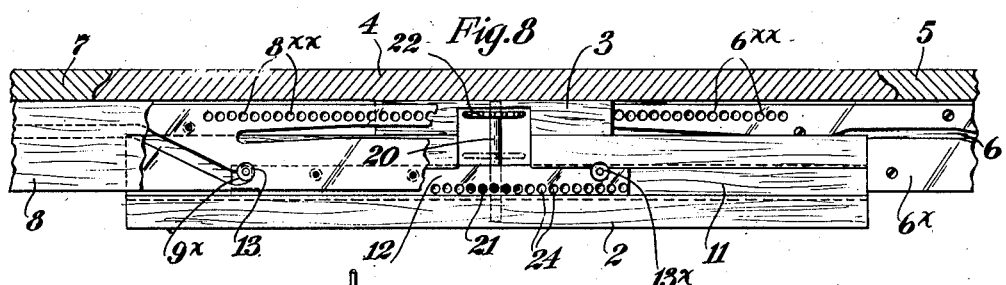
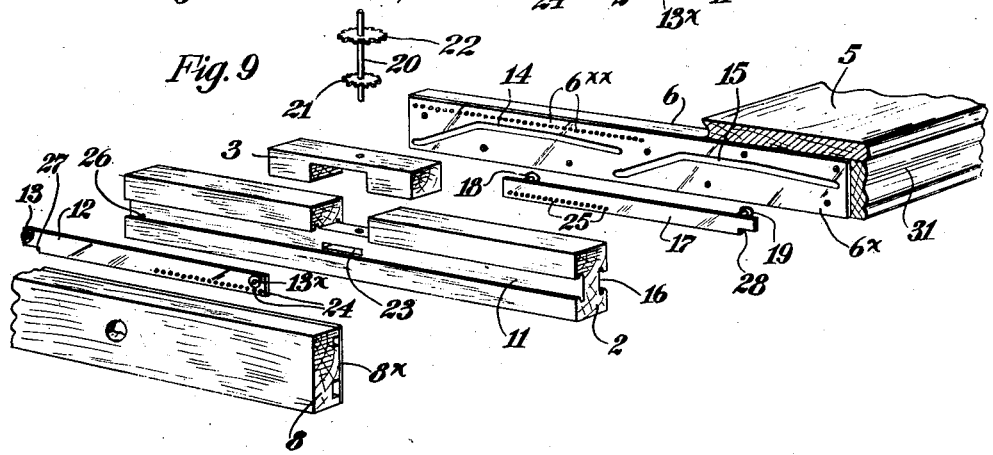
INVENTOR
Joseph Cooper
BY
ATTORNEY Patented Mar. 25, 1930

1,752,065

UNITED STATES PATENT OFFICE

JOSEPH COOPER, OF NEW YORK, N. Y.

AUTOMATIC EXTENSIBLE TABLE

Application filed December 1, 1927. Serial No. 236,923.

The object of the present invention is to provide a table comprising a centre leaf, which may be stationary, and leaves which, when the table is closed, lie under the centre leaf; outward movement of one underlying leaf acting upon that leaf and its companion leaf to simultaneously carry them both outwardly, then upwardly, a final and reverse movement carrying said movable leaves into the plane and in contact with the stationary leaf.

The invention will be described with regard to the following drawings in which—

Figure 1 is an end view of a table constructed in accordance with the invention showing in dotted lines the various positions of the underlying or movable leaves;

Figure 2 is a diagrammatic plan view showing the position of the movable leaves in closed and outermost position;

Figure 3 is a similar view showing the movable leaves in closed position and in contact with the stationary leaf;

Figure 4 is a plan view of a three-part slide member, partly broken away at one end, and Figure 5 is a vertical section on the line 5—5, Figure 4, with the stationary leaf in position, a fragment of the latter being shown;

Figure 6 is a vertical section on the line 6—6, Figure 4, showing the table in closed position;

Figure 7 is a view similar to Figure 6 showing the position of the slide members with the movable leaves in their outermost position;

Figure 8 is a view similar to Figure 7, showing the position of the slide members with the movable leaves in closed position and in contact with the stationary leaf;

Figure 9 is a detail perspective view of the slide and associated elements separated.

The table comprises suitable pedestal legs A, one being shown in Figure 1, and a horizontal supporting member 1 at the top of each pedestal leg. Each horizontal support 1 carries a fixed slide member 2 at the top of which is a block 3, which block directly supports the centre or stationary leaf 4.

I have shown and will describe the slide members for one end of the table only, the members for the opposite end being exactly the same, as is the case with the pedestal leg A and horizontal support 1. Disposed below stationary leaf 4 is a right hand movable leaf 5 carrying a slide bar 6. Opposite movable leaf 5 is a movable leaf 7 carried by a slide bar 8. Slide bars 6 and 7 lie against opposite sides of fixed member 2 and are held in operative contact therewith by the following instrumentalities:—

Slide bar 8 has secured thereto a metal plate 8$^x$ formed with tandem cam grooves 9, 10. Slide way 11 is formed in slide member 2 and receives a rack bar 12, the latter having studs 13, 13$^x$, the first stud entering cam groove 9 and being headed on a reverse side thereof and the second stud entering cam groove 10 and being headed in a similar manner. Inasmuch as slot 11 in the stationary slide member is a key-slot, rack bar 12 is held against movement except endwise and, through headed studs 13, serves to maintain slide 8 into contact with stationary slide member 2.

The slide member 6 for the movable leaf 5 also carries a cam plate, 6$^x$. Cam plate 6$^x$ is formed with tandem cam grooves 14, 15. Stationary slide member 2 is formed with a key-slot 16 to receive a rack bar 17, the latter having studs 18, 19. Stud 18 enters cam slot 14 and is headed on the opposite side thereof and stud 19 enters cam slot 15 and is headed in a like manner. Rack bar 17 is limited against movement except endwise and thus slide bar 6 is maintained in contact with stationary slide member 2.

Vertically supported by stationary slide 2 and block 3 is a shaft 20 which carries two pinions 21, 22. Pinion 21 is held against vertical movement in a horizontal slot 23 formed in stationary slide 2, and its teeth enter a horizontal row of rack holes 24 formed in rack bar 12 and a horizontal row of rack holes 25 formed in rack bar 17. The upper face of stationary slide 2 and the lower face of block 3 is cut away to permit a vertical movement of pinion 22 relatively to shaft 20. The teeth of pinion 22 enter a row of rack holes 8ˣˣ (Figures 6 to 8 inclusive) formed in plate 8.

In the operation of the device, assuming the parts to be in the position shown in Figure 6, a movement outwardly of either leaf 5 or 7 will impart a corresponding movement to the opposite leaf without affecting either of the rack bars 12, 17. In fact, each rack bar will be held against movement outwardly, because a stop pin 26 will engage a shoulder 27 on rack bar 12 and a similar pin will engage a shoulder 28 carried by rack bar 17, both pins being fixed on stationary slide member 2. Thus in such initial outward movement of the movable leaves studs 13, 13ˣ and 18, 19 will be fixed. Pinion 22 in engagement of its teeth with the rack holes of each cam plate 6ˣ and 8ˣ will convey the motion of one leaf to the other leaf. At a predetermined point of movement the downward inclined portion of each cam plate 6ˣ, 8ˣ will be acted upon by the studs engaging the grooves and the said outwardly moving leaves will be lifted to the position shown in Figure 7 wherein the movable leaves are in line with the stationary leaf 4 but outwardly spaced therefrom. At this point the hooked end 9ˣ of cam groove 9 will be entered by stud 13, thus affording a latching medium intermediate rack bar 12 and cam plate 8ˣ. The result is that when a reverse or inward movement is given to either movable leaf, an inward movement is imparted to the opposite leaf and to both of the rack bars (through pinion 21). Hence there is no relative movement between the rack bars and their respective cam plates. The leaves therefore move horizontally only and into edge contact with the centre leaf 4, as shown in Figure 8. Inasmuch as pinion 22 is free to move vertically on shaft 20, it partakes of the vertical movements of the cam plates and the leaves carried thereby.

In closing the table, the outer leaves are moved from the position shown in Figure 8 to the position shown in Figure 7. At this point leaf 7 is tilted upwardly slightly so as to carry the hooked end 9ˣ of cam groove 9 out of engagement with stud 13. While thus tilted the leaf 7 is moved inwardly, causing the inclined portion of the slot to permit the downward movement of slide bar 8 and, through the pinion connections, a corresponding movement to slide bar 6 until the substantially horizontal portion of each cam slot is reached whereupon a further inward movement will restore the leaves to the position shown in Figure 6.

Leaf 7 will carry a side rail 30 and end rails connected thereto. Also leaf 5 will carry a side rail 31 and end rails as will be understood by those skilled in the art.

Having described my invention what I claim and desire to secure by Letters Patent is as follows:—

1. A table comprising a support, a plurality of leaves including a centre leaf and movable leaves, the latter lying under the center leaf when the table is closed, slides carrying the movable leaves, a cam groove for each of said slides, a rack bar held for endwise movement only and having a stud engaging the cam groove of its slide, pinion connections intermediate the rack bars for said slides and pinion connections intermediate racks appurtenant to said slides, the latter pinion connections rising and falling with the slides, as and for the purpose set forth.

2. A table comprising a support, a centre leaf held by said support, opposed slides each carrying a leaf adapted to lie under the centre leaf, a fixed slide intermediate said slides, rack bars carried by said fixed slide member for movement endwise only, studs carried by said rack bars and entering cam grooves provided in the slides, pinion connections intermediate said rack bars and pinion and rack connections intermediate the slides provided with said cam grooves.

3. A table comprising a support, a centre leaf held by said support, a plurality of leaves adapted to lie under the center leaf when the table is closed, a slide for each under leaf, cam grooves formed in such slides, stud carrying members having studs entering said cam grooves, and permitting relative movement between the slides and said stud carrying members during a movement of an under leaf outwardly into the plane of the centre leaf, walls of said cam grooves coacting with the studs to cause simultaneous movement of said leaf and the stud carrying members to bring the under leaf into edge contact with the centre leaf, and rack and pinion connections intermediate said slides.

4. In automatic extension tables comprising a centre leaf, leaves adapted to lie under the centre leaf, a slide combination for the under leaves comprising a fixed slide member formed with a key-slide way, movable slide members adjacent the fixed member, rack and pinion connections intermediate the movable slide members, and cam and stud connections intermediate said movable slide members and the fixed slide member, rack bars slidable in said key slide-way and carrying said studs, the cams being carried by the movable slides and engaged by said studs, a pinion connecting said rack bars and rack and pinion connections intermediate the slides.

In testimony whereof, I have signed my name to this specification.

JOSEPH COOPER.